US011442582B1

(12) United States Patent
Chakraborty et al.

(10) Patent No.: US 11,442,582 B1
(45) Date of Patent: Sep. 13, 2022

(54) VIRTUAL KEYPADS FOR HANDS-FREE OPERATION OF COMPUTING DEVICES

(71) Applicant: ZEBRA TECHNOLOGIES CORPORATION, Lincolnshire, IL (US)

(72) Inventors: Joydeep Chakraborty, Bangalore (IN); Ankit Kumar, Bangalore (IN); Mukesh Prabhakar, Bangalore (IN); Akashdeep Parida, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/193,610

(22) Filed: Mar. 5, 2021

(51) Int. Cl.
*G06F 3/042* (2006.01)
*G06T 11/60* (2006.01)
*G06F 3/04886* (2022.01)

(52) U.S. Cl.
CPC ........ *G06F 3/0426* (2013.01); *G06F 3/04886* (2013.01); *G06T 11/60* (2013.01); *G06T 2200/24* (2013.01)

(58) Field of Classification Search
CPC .... G06F 3/0426; G06F 3/04886; G06T 11/60; G06T 2200/24
See application file for complete search history.

(56) References Cited

U.S. PATENT DOCUMENTS

| | | | | |
|---|---|---|---|---|
| 10,176,636 B1 * | 1/2019 | Neustein | ............... | G06T 15/205 |
| 10,511,731 B1 * | 12/2019 | Rao | .......................... | G06T 11/00 |
| 2009/0295730 A1 * | 12/2009 | Shin | ...................... | G06F 3/0221 |
| | | | | 455/566 |
| 2010/0177035 A1 * | 7/2010 | Schowengerdt | ........ | G06F 1/163 |
| | | | | 345/156 |
| 2012/0249741 A1 * | 10/2012 | Maciocci | .............. | G06T 19/006 |
| | | | | 348/51 |
| 2013/0038521 A1 * | 2/2013 | Sugaya | ................ | G02B 27/017 |
| | | | | 345/156 |
| 2014/0266988 A1 * | 9/2014 | Fisher | .................. | G02B 27/017 |
| | | | | 345/8 |
| 2015/0121287 A1 * | 4/2015 | Fermon | ................. | G06F 3/0304 |
| | | | | 715/773 |
| 2015/0268799 A1 * | 9/2015 | Starner | ................. | G06F 3/0426 |
| | | | | 345/175 |
| 2017/0200046 A1 * | 7/2017 | Bang | .................... | H04L 63/0861 |
| 2018/0232106 A1 * | 8/2018 | Zhang | ................... | G06F 3/0304 |
| 2018/0321737 A1 * | 11/2018 | Pahud | ................... | G06F 3/0304 |
| 2019/0179419 A1 * | 6/2019 | He | ........................ | G06V 10/147 |
| 2019/0265781 A1 * | 8/2019 | Kehoe | ..................... | G06F 1/163 |
| 2021/0011621 A1 * | 1/2021 | Becker | ................ | G06F 3/04886 |

* cited by examiner

Primary Examiner — Ibrahim A Khan

(57) ABSTRACT

A method includes: detecting, at a computing device coupled to an image sensor, an input request; in response to detecting the input request, capturing a reference image via the image sensor, the reference image containing a virtual keypad having a set of virtual keys; detecting, in the reference image, the set of virtual keys; capturing, via the image sensor, a key-press image of the virtual keypad; detecting, in the key-press image, a subset of the virtual keys; comparing the set of virtual keys and the subset of virtual keys to identify a key-press obscuring one of the virtual keys; and returning input data corresponding to the obscured virtual key.

20 Claims, 8 Drawing Sheets

VIRTUAL KEYPADS FOR HANDS-FREE OPERATION OF COMPUTING DEVICES

BACKGROUND

Hands-free operation of computing devices may be employed in operating environments such as warehouses and the like, where operators of the computing devices may be required to perform manual tasks that preclude manual operation of a computing device. Input methods for such deployments of computing devices, however, such as voice input, may suffer from reduced accuracy relative to manual input methods.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
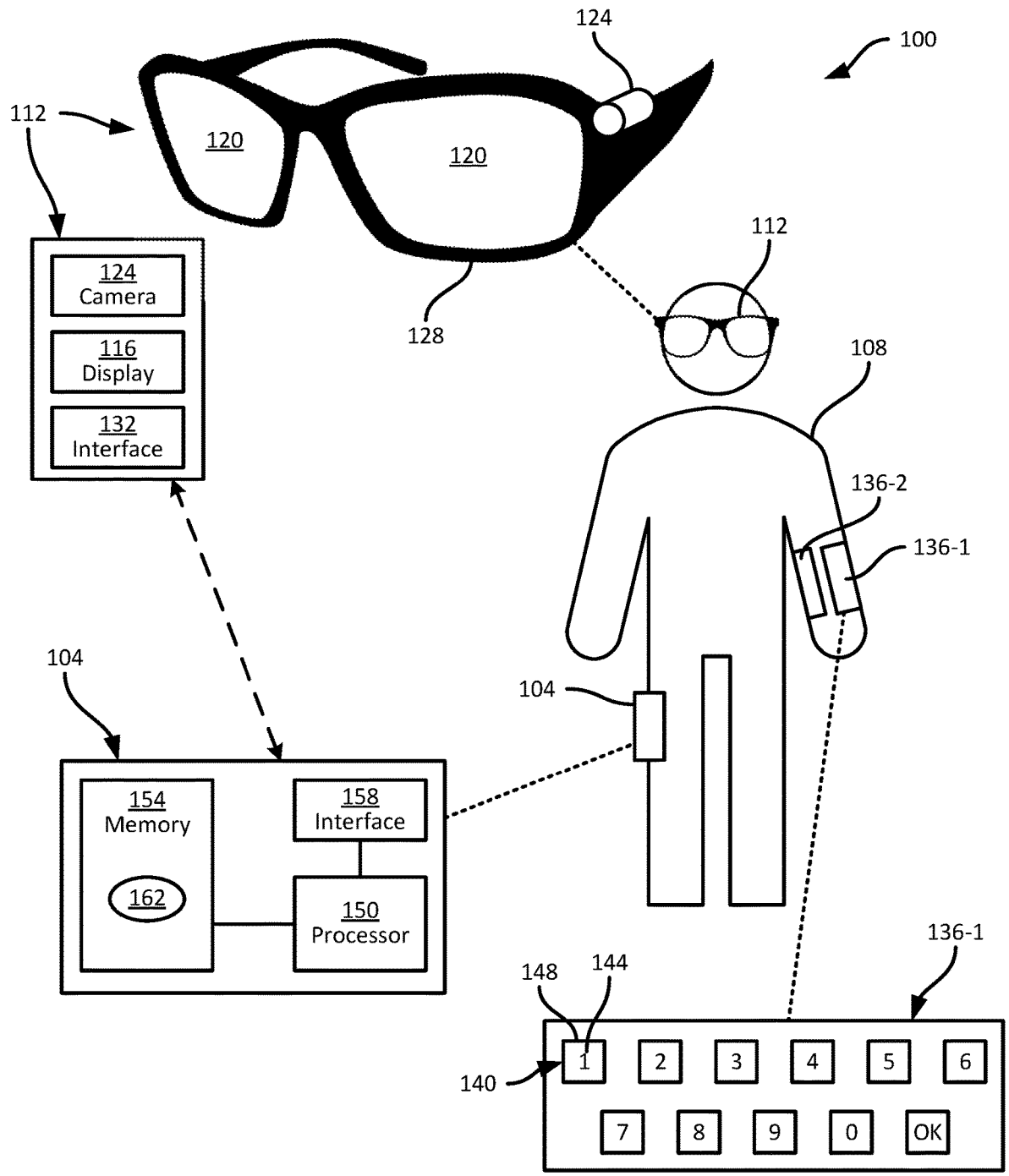
FIG. 1 is a diagram of a system for providing virtual keypads for hands-free operation of a computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: detecting, at a computing device coupled to an image sensor, an input request; in response to detecting the input request, capturing a reference image via the image sensor, the reference image containing a virtual keypad having a set of virtual keys; detecting, in the reference image, the set of virtual keys; capturing, via the image sensor, a key-press image of the virtual keypad; detecting, in the key-press image, a subset of the virtual keys; comparing the set of virtual keys and the subset of virtual keys to identify a key-press obscuring one of the virtual keys; and returning input data corresponding to the obscured virtual key.

Additional examples disclosed herein are directed to a computing device, comprising: a processor; and an interface coupling the processor to an image sensor; wherein the processor is configured to: detect an input request; in response to detecting the input request, capture a reference image via the image sensor, the reference image containing a virtual keypad having a set of virtual keys; detect, in the reference image, the set of virtual keys; capture, via the image sensor, a key-press image of the virtual keypad; detect, in the key-press image, a subset of the virtual keys; compare the set of virtual keys and the subset of virtual keys to identify a key-press obscuring one of the virtual keys; and return input data corresponding to the obscured virtual key.

Further examples disclosed herein are directed to a system, comprising: a head-mounted display including an image sensor; a controller coupled to the head-mounted display, the controller configured to: detect an input request; in response to detecting the input request, capture a reference image via the image sensor, the reference image containing a virtual keypad having a set of virtual keys; detect, in the reference image, the set of virtual keys; capture, via the image sensor, a key-press image of the virtual keypad; detect, in the key-press image, a subset of the virtual keys; compare the set of virtual keys and the subset of virtual keys to identify a key-press obscuring one of the virtual keys; and return input data corresponding to the obscured virtual key.

FIG. 1 illustrates a system 100 for providing virtual keypad input to a computing device with a hands-free mode of operation. The system 100 includes a computing device 104, such as a mobile computing device worn or otherwise carried (e.g. in a holster, a pocket or the like) by an operator 108. The device 104 can be a smart phone, a tablet computer, or the like. Although the device 104 may include a display, as well as input devices such as a keypad or keyboard implemented via a touch screen or a set of electro-mechanical switches for detecting key presses, the computing device 104 is also configured for hands-free operation. Hands-free operation, as discussed herein, is the operation of the device 104 by the operator 108 without physically manipulating the device 104. That is, the device 104 may remain on a belt, holster or the like worn by the operator 108 throughout the duration in which hands-free operation is enabled.

As will now be apparent, devices such as the above-mentioned keypad, display and the like may be inaccessible to the operator 108 when the device 104 is in a hands-free mode. To enable interaction between the operator 108 and the device 104, the system 100 therefore includes additional input and output mechanisms that remain accessible to the operator 108 during hands-free operation. In the illustrated example, the system 100 includes a head-mounted display (HMD) device 112, also referred to simply as the HMD 112. The HMD 112 is implemented in this example as a pair of glasses to be worn by the operator 108. The HMD 112 includes at least a display 116, e.g. integrated with one or both lenses 120 of the HMD 112. The display 116 may be implemented as a projector mounted to a frame of the HMD 112 in some embodiments, and configured to project images onto either or both of the lenses 120.

The HMD 112 also includes a camera 124, e.g. affixed to a frame 128 of the HMD 112. The camera 124 is oriented to direct a field of view (FOV) thereof in a direction corresponding to the FOV of the operator 108 themselves. In other words, the camera 124 captures at least a portion of the operator 108's FOV. The HMD 112 also includes a communications interface 132 enabling the receipt of data from the device 104 for presentation on the display 116, as well as the transmission of data (e.g. captured by the camera 124) to the device 104. The HMD 112 can include additional input and output devices, such as one or more microphones, speakers, or the like (not shown in FIG. 1). The HMD 112 may also include a local controller configured to manage the operation of the display 116, camera 124 and interface 132.

As will now be apparent to those skilled in the art, some tasks performed by the operator 108 may involve data entry at the device 104. For example, the operator 108 may be required to be provide quantities, product identifiers, or the like to the device 104 for further processing, transmission to another device, or the like. Entering such data via the integrated input devices of the device 104 (e.g. a keypad, touch screen or the like) may require removal of the device 104 from the above-mentioned holster, pocket or the like, which may be time-consuming and interrupt hands-free operation.

Although an input device such as a microphone of the HMD 112 may be employed to capture such input data, spoken input is vulnerable to misinterpretation by the device 104, e.g. due to noisy operating environments, accented speaking, and the like. The device 104 and the HMD 112 are therefore configured, as described in detail below, to enable data entry to the device 104 via at least one virtual keypad 136 that can be accessed by the operator 108 without manipulating the device 104 directly (that is, while leaving the device 104 in a pocket, holster, etc.). The use of virtual keypads as described herein also enables the provision of input data to the device 104 that may be less susceptible to misinterpretation than voice input, and that enables a wide variety of input types to be deployed via different virtual keypads. In some examples, virtual keypads 136 may also be deployed without any configuration changes being made to the device 104 or the HMD 112.

In the illustrated example, one or more virtual keypads 136 are deployed by affixing the virtual keypads 136 to the operator 108, e.g. as printed sheets inserted into plastic cases on a sleeve of the operator 108. The virtual keypads 136 may also be deployed on various other surfaces, however, including surfaces that do not travel with the operator 108. In further examples, virtual keypad definitions may be stored by the HMD 112 or the device 104 and projected onto arbitrary surfaces, e.g. from a projector of the HMD 112. When the display 116 of the HMD 112 is implemented via projection, the display 116 and projected virtual keypads may be implemented via separate projection hardware (e.g. a first projector to implement the display 116 on the lenses 120, and a second projector to project virtual keypads external to the HMD 112).

The virtual keypads 136 are referred to as virtual because they do not include any switches or other circuitry for detecting key presses. In other words, the virtual keypads 136, in isolation, are merely non-functional images of keypads. Virtual keypads 136 can therefore be produced simply by generating a key layout (according to certain preferred, but non-mandatory, constraints discussed below), and printing the layout or otherwise applying the layout to a physical surface. The HMD 112 and the device 104 implement functionality to detect key presses on a virtual keypad 136 under certain conditions.

FIG. 1 illustrates two virtual keypads 136-1 and 136-2, affixed to a sleeve of the operator 108. To make use of a virtual keypad 136, the operator 108 may bring the desired one of the keypads 136 into the field of view of the camera 124, following which the HMD 112 and the device 104 are configured to cooperate to detect the virtual keypad 136 and virtual key presses thereon. Virtual key presses are made by the operator by placing a finger over the desired key, substantially concealing the desired key from view by the camera 124.

A detailed view of the virtual keypad 136-1 is also illustrated in FIG. 1. In particular, the keypad 136-1 includes a set of virtual keys 140, which in this example represent digits from zero to nine, as well as an "enter" key. Other virtual keypads 136 can include a wide variety of virtual keys, including alphanumeric keys, function keys, and the like. Each key 140 includes certain features enabling detection of the key 140 in images captured by the camera 124. In the illustrated example, each key 140 includes an indicium 144 (e.g. the numeral "1") indicating input data to be generated in response to detection of a virtual key press of that key 140. Each key 140 may also include a graphical feature 148, such as an edge or the like, to facilitate detection of the key 140 via image processing techniques. The graphical features 148 can also include patterns of dots, lines or the like detectable via machine vision and separate from the indicium 144 (which may also be detectable via machine vision, as will be apparent).

FIG. 1 further illustrates certain internal components of the device 104. In particular, the device 104 includes a controller, such as a processor 150, interconnected with a non-transitory computer readable storage medium, such as a memory 154. The memory 154 includes a combination of volatile memory (e.g. Random Access Memory or RAM) and non-volatile memory (e.g. read only memory or ROM, Electrically Erasable Programmable Read Only Memory or EEPROM, flash memory). The processor 150 and the memory 154 each comprise one or more integrated circuits. The device 104 also includes a communications interface 158 enabling the device 104 to exchange data with other devices, including the HMD 112, e.g. via short-range connections such as Bluetooth or the like. Additional components of the device 104, such as the display, touch screen and the like mentioned above, are not shown.

The memory 154 stores computer readable instructions for execution by the processor 150. In particular, the memory 154 stores a virtual input detector application 162 which, when executed by the processor 150, configures the processor 150 to obtain and process image data from the HMD 112 and detect the virtual keypads 136 therein, as well as virtual key presses. The application 162 can, for example, be called by other applications (not shown) executed by the processor 150 when such other applications require input data. For example, an application may generate an input field for receiving input data from the operator 108. While in the hands-free mode of operation, instead of rendering the field on a local display of the device 104, the processor 150 can transmit instructions to the HMD 112 to render the field on the display 116. The processor 150 can also generated an input request, which is detected by the application 162, which in response initiates the detection and processing mechanisms for input via the virtual keypads 136.

Those skilled in the art will appreciate that the functionality implemented by the processor 140 via the execution of the application 156 may also be implemented by one or more specially designed hardware and firmware components, such as FPGAs, ASICs and the like in other embodiments. In further examples, the HMD 112 itself can include processing hardware implementing the above functions, instead of those functions being implemented by the device 104.

Figure 2:
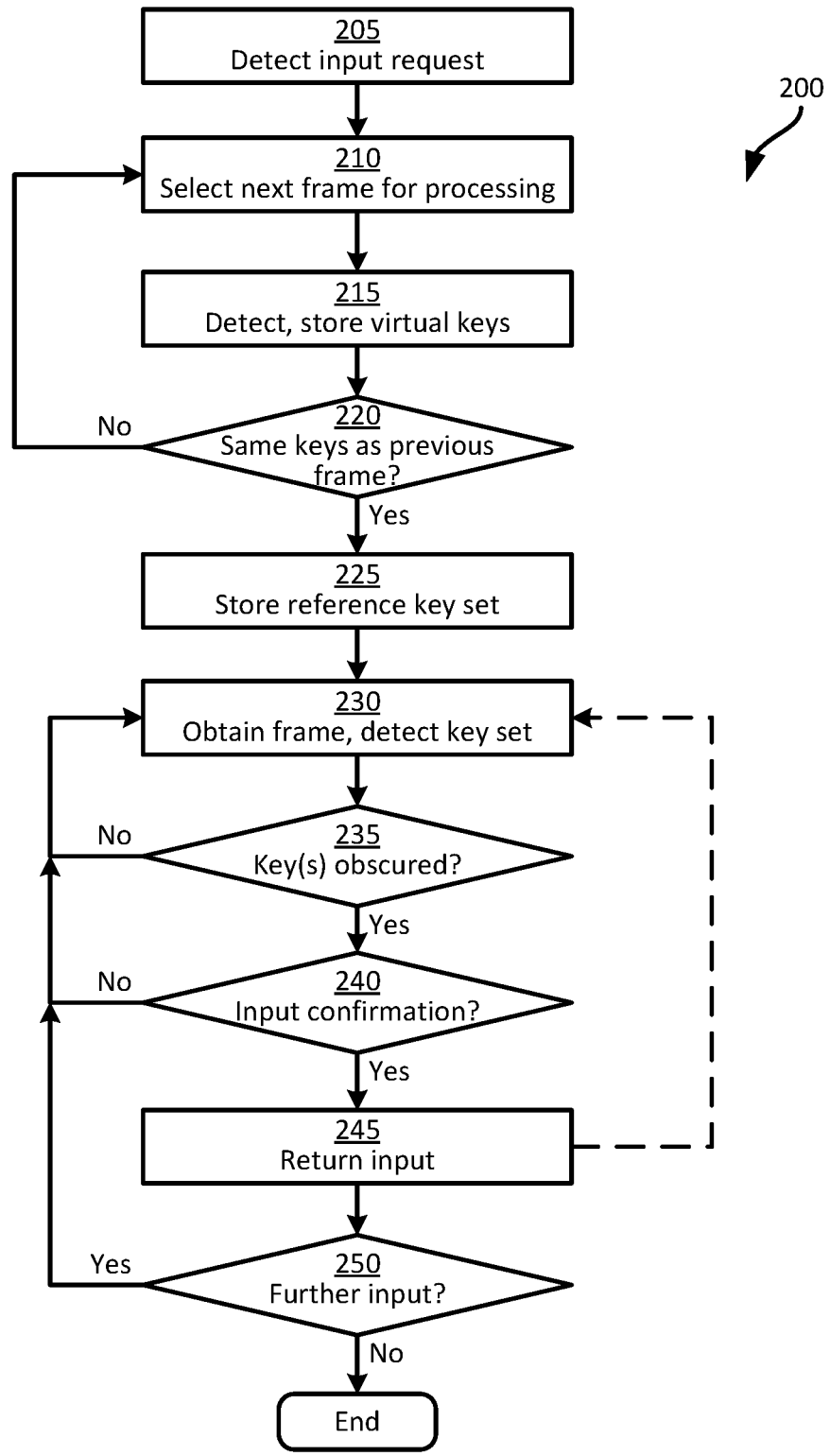
FIG. 2. is a flowchart of a method for virtual keypad input in the system of FIG. 1.

Turning to FIG. 2, a method 200 of hands-free operation of the device 104 via the virtual keypads 136 is illustrated. The method 200 will be described in conjunction with its performance by the device 104 in cooperation with the HMD 112. That is, the blocks of the method 200 are performed by the processor 150, via execution of the application 162. As noted above, however, in some examples the HMD 112 itself may perform some or all of the blocks of the method 200.

At block 205, the processor 150 is configured to detect an input request. The input request can be generated at the processor 150 via execution of another application. For example, any of a variety of applications executed by the processor 150 may generate input requests via calls to the application 162. The application 162 itself may then be responsible for obtaining input data, which is passed back to the calling application. The input request may therefore include a request for input data to populate a form presented on the display 116, for example.

Responsive to detecting the input request, the processor 150 is configured to activate the camera 124, if the camera 124 is not already active. When active, the camera 124 captures and provides to the processor 150 a sequence of images, e.g. in the form of a video stream. Each image in the stream is also referred to below as a frame. The processor 150 is configured to process at least a subset of the frames received from the HMD 112, and in some examples processes each frame received from the HMD 112 in sequence.

At block 210, the processor 150 is configured to select the next frame from the HMD 112 (specifically, captured by the camera 124) for processing. In the examples described below, the processor 150 is assumed to process each frame from the camera 124, in the order in which the frames are captured.

At block 215, the processor 150 is configured to detect any virtual keys 140 in the frame selected at block 210. Detection of the virtual keys 140 can include performing edge detection or other suitable feature detection processes on the frame, e.g. depending on the graphical features 148 used to identify the virtual keys 140. For any virtual keys 140 so identified, the processor 150 can also detect (e.g. via optical character recognition (OCR) or additional graphical features) the indicia 144 corresponding to each virtual key 140. The processor 150 is further configured to maintain a list, map or the like of the detected virtual keys 140 for later processing.

Figure 3:
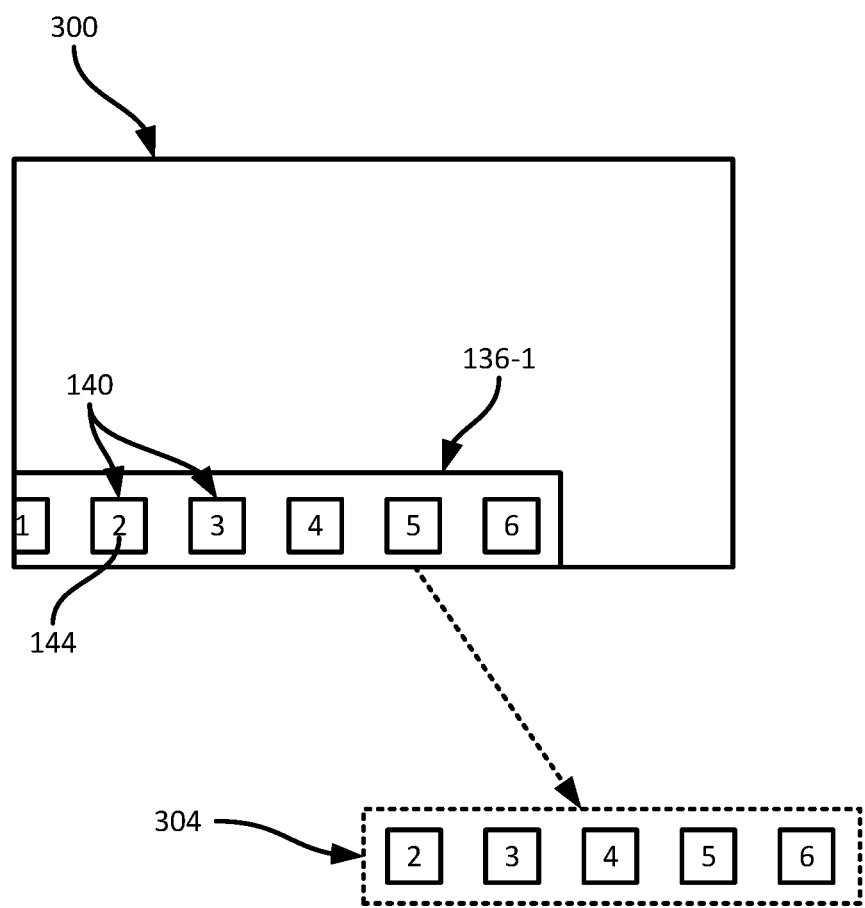
FIG. 3 is a diagram illustrating an example performance of blocks 210 and 215 of the method of FIG. 2.

Turning to FIG. 3, an example image 300 is shown, as captured by the camera 124 and transmitted to the device 104 via the interface 132. The image 300 depicts a portion of the virtual keypad 136-1. As will now be apparent, when the hands-free input mode implemented via the method 200 is initiated via the input request at block 205, the operator 108 may still need to bring the desired virtual keypad 136 into the FOV of the camera 124, by moving either or both of the HMD 112 (e.g. by the operator 108 moving their head) and the virtual keypad 136 itself (e.g. by the operator 108 moving their arm). The virtual keypad 136-1 may therefore not immediately be fully visible to the camera 124 upon initiation of the method 200.

FIG. 3 also illustrates a set 304 of detected virtual keys 140 resulting from a performance of block 215. The set 304 is represented graphically in FIG. 3, but may be stored in the memory 154 as a list or in any other suitable format. The information stored at block 215 includes at least the indicium 144 associated with each detected virtual key 140. In some examples, the processor 150 can also store the relative positions of the detected virtual keys 140. For example, the processor 150 can determine image coordinates (e.g. pixel coordinates) of each virtual key 140, corresponding to a center, a particular corner, or the like, of the key 140. The processor 150 can then determine the relative positions of the detected keys 140, e.g. using a first key as a reference key and determine the distances in pixels between the keys 140 based on the reference key.

In other examples, the relative position (e.g. in image coordinates, along X and Y axes of the image coordinates) of each key relative to all other keys can be stored, rather than employing a single reference key. For example, in the example of FIG. 3, for the "2" key, a distance between the "2" key and each of the other keys 140 in the set 304 can be stored. Similar sets of distances can be stored for all the other detected keys 140.

In further examples, the relative positions of the detected keys 140 can be omitted, and the processor 150 can simply store the indicia 144. The data stored at block 215 is stored for at least a predefined number of frames, period of time, or the like, for comparison to data obtained by processing of subsequent frames.

Returning to FIG. 2, at block 220 the processor 150 is configured to determine whether the virtual keys 140 detected at block 215 match a set of virtual keys detected in at least one previous performance of block 215. The determination at block 220 may be configured to compare the current set of detected virtual keys to any predetermined number of frames. In general, the performance of blocks 215 and 220 enables the device 104 to verify that a virtual keypad 136 has fully entered the FOV of the camera 124 and remains within the FOV, indicating that the virtual keypad 136 is likely to be the keypad desired for use in providing input data. Repeated detections and comparisons with previous detections enable the device 104 to make this determination without prior knowledge of the layout(s) of the virtual keypads 136. The threshold for a positive determination at block 220 may therefore be that the currently detected set of keys 140 matches the detected set of keys 140 from the preceding frame. In other examples, a positive determination at block 220 may require that the current set match the two preceding sets, or at least three of the preceding five sets. As will now be apparent, a wide variety of other criteria may also be applied at block 220.

Figure 4:
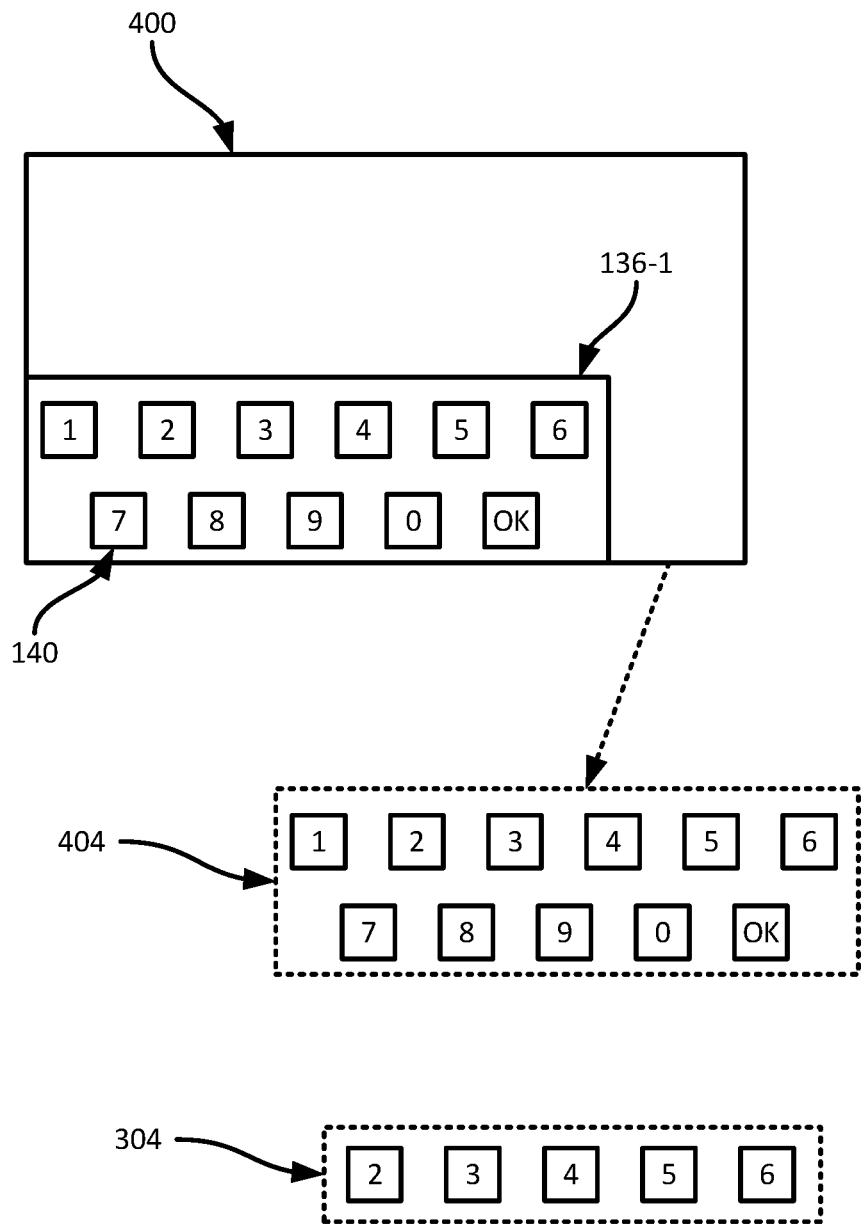
FIG. 4 is a diagram illustrating another example performance of blocks 210 and 215 of the method of FIG. 2.

The detected keys 140 shown in FIG. 3 constitute the first detection, and the determination at block 220 is therefore negative, as no detections for a previous frame are stored. The processor 150 therefore returns to block 210. At block 210, the processor 150 selects the next frame for processing (i.e. following the frame 300 in time). At block 215, the processor 150 repeats the detection mentioned above. FIG. 4 illustrates a further frame 400, in which a greater portion of the virtual keypad 136-1 is visible, including all of the virtual keys 140 (although the processor 150, lacking predetermined awareness of the layout of the keypad 136-1, does not detect that the full set of keys 140 are visible).

Repeating block 215, the processor 150 generates and stores a set 404 of key detections, including at least the indicia 144 of the detected keys 140, and optionally including the relative positions of the keys 140. At block 220, as seen in FIG. 4, the determination is negative because the sets 304 and 404 do not match. The processor 150 therefore returns once again to block 210.

Figure 5:
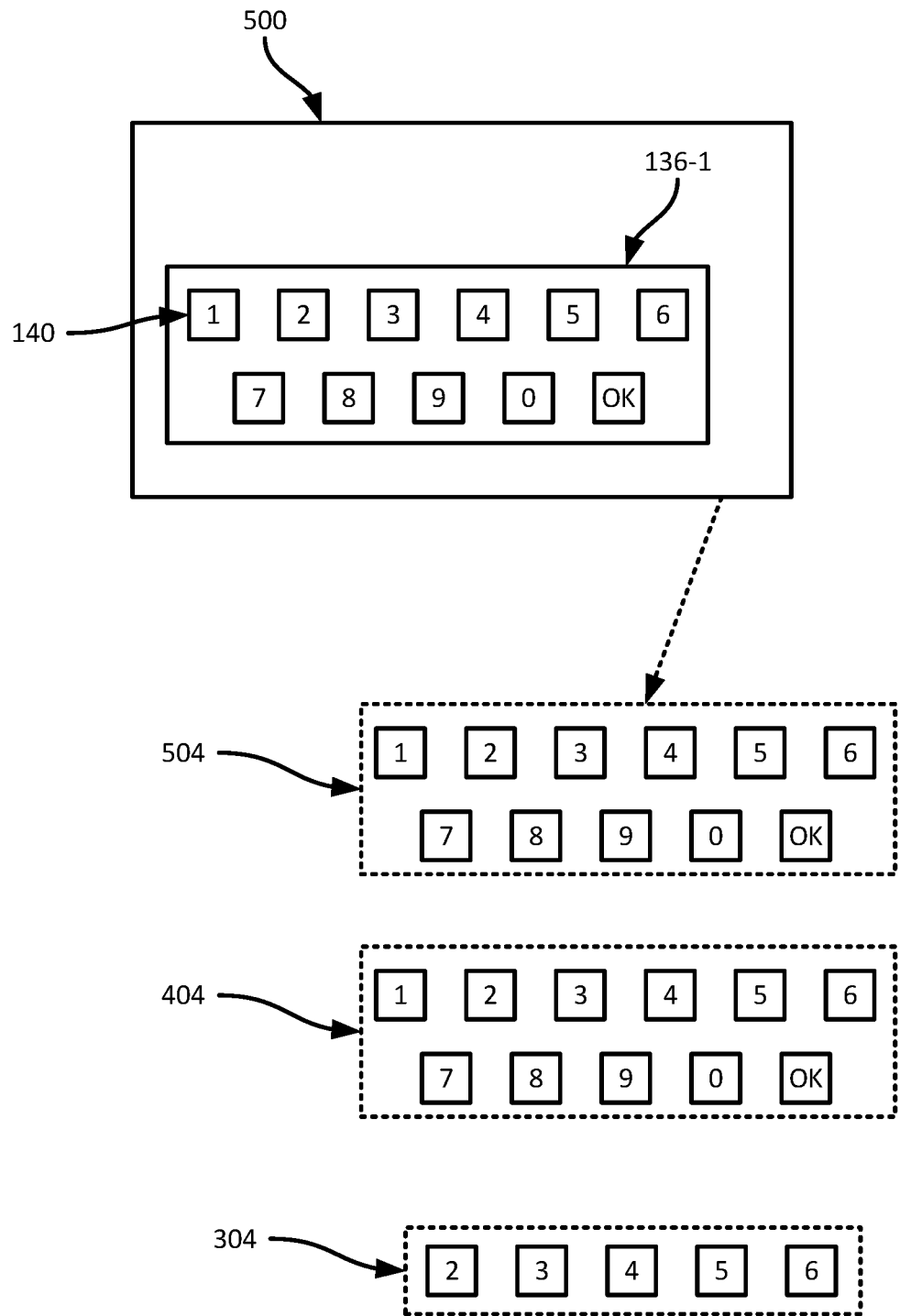
FIG. 5 is a diagram illustrating a further example performance of blocks 210 and 215 of the method of FIG. 2.

FIG. 5 illustrates a further example performance of blocks 210 and 215, in which a frame 500 is captured by the camera 124, and provided to the processor 150. The processor 150 repeats the detection of virtual keys 140, and stores a detected set 504 of keys 140, e.g. in the memory 154. As seen in FIG. 5, the set 504 matches the set 404, in that the indicia 144 of the detected keys in the set 504 are the same as the indicia 144 of the keys 140 in the set 404. When relative positions of the keys 140 are also stored, the processor 150 can also verify that the relative positions between keys 140 match between the sets 404 and 504, at least within a certain threshold (e.g. within a certain number of pixels) to account for movement and flexibility of the material upon which the virtual keypad 136-1 is deployed.

The determination in the example of FIG. 5 is therefore affirmative, and the processor 150 is configured to proceed to block 225. As will now be apparent, the performance of blocks 210, 215, and 220 enables the processor 150 to determine when to activate an input mode, by detecting when the virtual keypad 136-1 is present and stable within the FOV of the camera 124. In the input mode, changes to the detected set of keys 140 indicate virtual key presses. As will be apparent, interpreting changes in the detected set of keys 140 as key presses before confirming that the keypad 136 is present and stable could lead to inaccurate input data.

Returning to FIG. 2, at block 225 the processor 150 is configured to store the most recent set of detected keys 140 (that is, the set resulting in the affirmative determination at block 220) as a reference set of keys 140. The image from which the reference key set was detected may also be referred to as a reference image. The preceding images processed via blocks 210 and 215 may be referred to as initial images. Thus, in this example performance of the method 200, the image 500 is a reference image, and the set 504 of keys 140 is the reference set of keys. Subsequent detections of virtual key presses are made by comparing sets of detected keys from additional images to the reference set 504.

At block 225 the processor 150 can also control an output device, e.g. of the device 104 itself or the HMD 112, to generate a notification or other feedback indicating to the operator 108 that the input mode is active. The feedback can include a beep or other sound, a vibration, and indication on the display 116 that the input mode is active, and the like.

Following block 225, the processor 150 continues to receive images from the camera 124, and processes such images, or at least a subset of such images (e.g. every second frame, every third frame, or the like, depending on the computational performance of the device 104 and/or the frame rate of the camera 124), to detect virtual key presses.

At block 230, the processor 150 is configured to obtain a frame for processing, e.g. by receiving the frame from the camera 124 as discussed in connection with block 210. The processor 150 is further configured to detect virtual keys 140 in the frame as discussed in connection with block 215.

At block 235, the processor 150 is configured to determine whether the detections at block 230 indicate that any of the virtual keys 140 are obscured. In particular, the processor 150 is configured to compare a detected subset of keys 140 from the current frame (which may also be referred to as a key-press frame) with the reference set of keys 140 stored at block 225. Any keys 140 that appear in the reference set, but not in the current set, are assumed to be obscured. When no obscured keys are detected (e.g. when the reference set and the current set match), the determination at block 235 is negative, and the processor 150 returns to block 230.

An obscured key is one for which the indicium 144 is not detected in the frame. For example if at least a portion of the graphical features 148 are detectable, but the indicium 144 is not shown, or an insufficient portion of the indicium is shown for interpretation, the key is considered to be obscured. Further, if a portion of the graphical features 148 of the key 140 are not detected, but the indicium 144 is detected, the key 140 is not assumed to be obscured. When the determination at block 235 is affirmative for more than one key (that is, two or more keys are obscured), the processor 150 can be configured to select one of the obscured keys 140 as a candidate for further processing. Selection of a candidate key 140 can be performed, for example, by detecting a position of a fingertip of the operator 108 in the frame. The position of the fingertip can then be determined relative to the reference key set, and the processor 150 can compare the position of the fingertip to the stored positions of the keys 140 in the reference set. The obscured key 140 having the closest reference position to the fingertip position can be selected as the obscured key 140. In other examples, the processor 150 can make a negative determination at block 235 until only one key 140 is obscured.

When the determination at block 235 is affirmative, the processor 150 proceeds to block 240, to determine whether input confirmation has been detected. An obscured key 140 in a single frame, as detected at block 235, may not necessarily indicate a deliberate virtual key press on the part of the operator 108. For example, the operator 108 may temporarily obscure one key 140 while moving a finger towards another key 140. In other examples, the detection process at block 230 may fail to detect a key due to brief variations in lighting, motion blur or other artifacts. To prevent such events from incorrectly being interpreted as virtual key presses, the processor 150 can determine whether one or more key press criteria are satisfied at block 240.

For example, the processor 150 can determine whether the obscured key 140 detected at block 235 has been obscured for a threshold period of time and/or number of frames, indicating an increased likelihood that the operator 108 has deliberately covered the relevant key 140. When such criteria are satisfied, the frame from block 230 may also be referred to as a key-press frame, as it depicts a virtual key press.

In other examples, the HMD 112 may include a depth sensor, either integrated with the camera 124 or implemented as a separate component. The depth sensor may be a second camera, enabling the capture of stereo images, or a depth camera, a lidar sensor, or the like. When a depth sensor is available, the processor 150 can identify a depth between the surface carrying the virtual keypad 136, and the finger of the operator 108. When such depth information is available, the determination at block 240 can include determining whether the depth between the finger and the surface bearing the keypad 136 is below a threshold.

When the determination at block 240 is negative, the processor 150 continues capturing frames, detecting obscured keys, and repeating the determination at block 240. When the determination at block 240 is affirmative, the processor 150 is configured to proceed to block 245, at which the input (that is, the virtual key press detected via blocks 235 and 240) is returned to the source of the input request from block 205.

Figure 6:
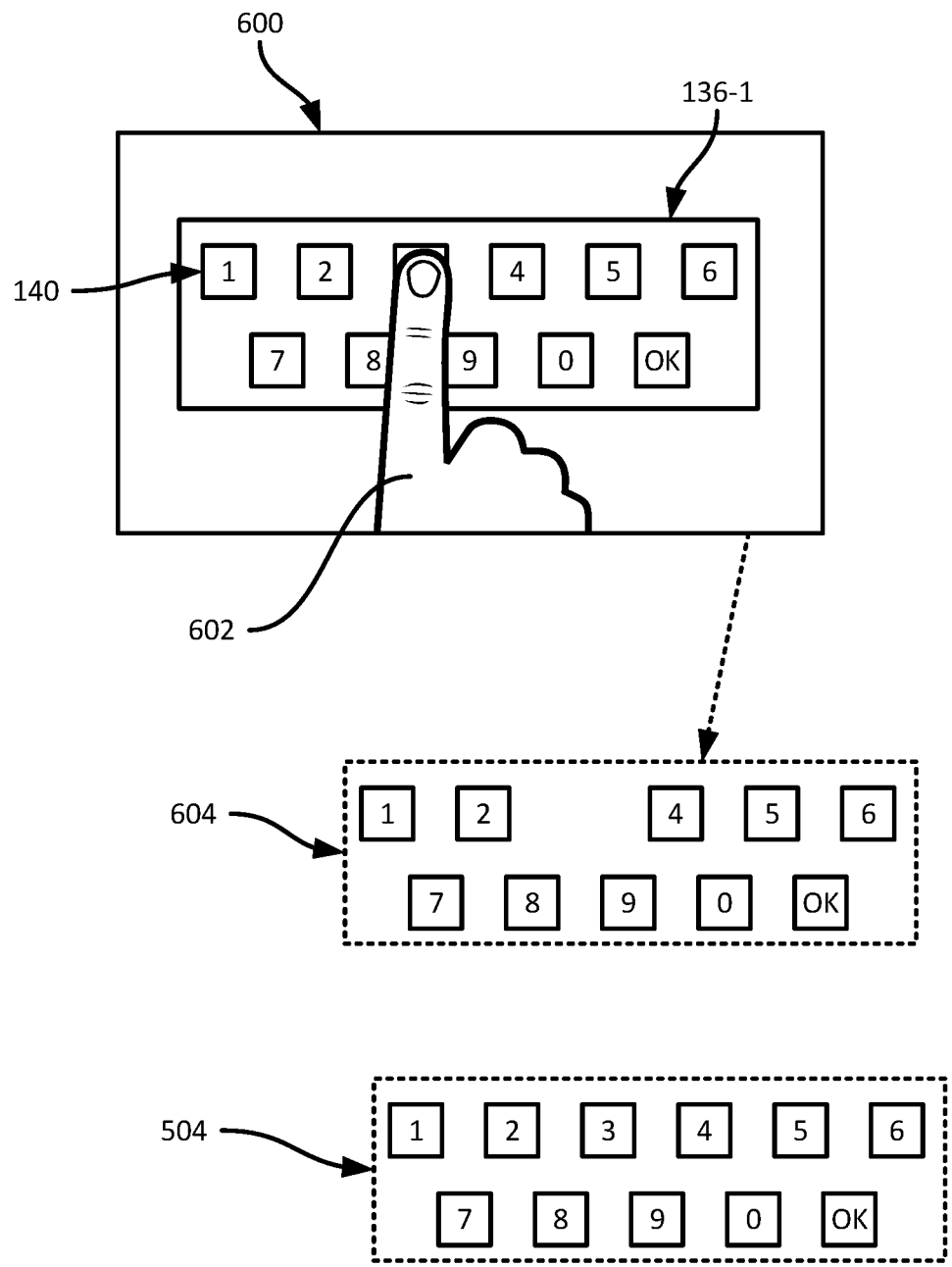
FIG. 6 is a diagram illustrating an example performance of blocks 230 and 235 of the method of FIG. 2.

FIG. 6 illustrates an example performance of blocks 235 and 240. In particular, a frame 600 depicts the virtual keypad 136-1, as well as a finger 602 of the operator 108. The finger 602 obscures the "3" key 140, with the result being that a current detected set 604 of the keys 140 omits the "3" key. The comparison of the set 604 with the reference set 504 reveals that the "3" key is obscured. If the key is obscured for a sufficient length of time (or if any other suitable criteria, examples of which are mentioned above, are satisfied), then the determination at block 240 is affirmative for the "3" key.

Figure 7:
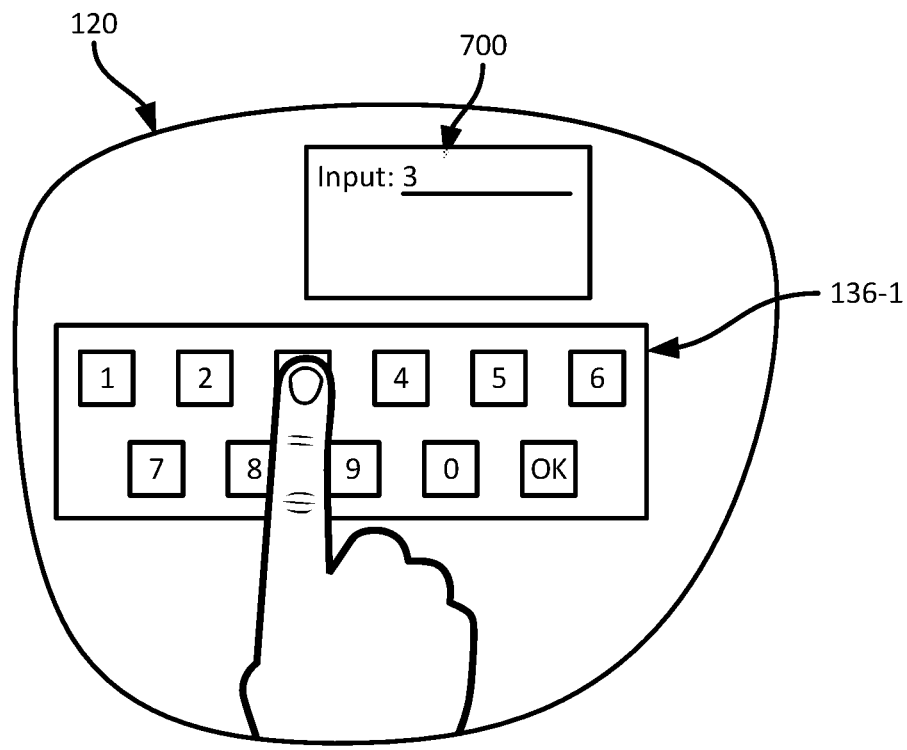
FIG. 7 is a diagram illustrating an input notification generated at block 245 of the method of FIG. 2.

Returning to FIG. 2, at block 245 the processor 150 is configured to return the input (e.g. the virtual press of the "3" key shown in FIG. 6) to the requesting application. The requesting application is the source of the input request from block 205. The processor 150 can also generate feedback to indicate to the operator 108 that input has been detected and returned. For example, as shown in FIG. 7, a view through one of the lenses 120 is shown, including the virtual keypad 136-1 and the hand of the operator 108. As noted above, the FOV of the camera 124 overlaps substantially with the FOV of the operator 108 through the lenses 120, as illustrated in FIG. 7. Also shown in FIG. 7 is an overlay 700 generated by the processor 150 at block 245, e.g. to provide an augmented reality display of currently received input. More generally, the device 104 is configured to generate a notification indicating that input data has been detected (e.g. audible, vibration, or the like).

At block 250, the processor 150 is configured to determine whether to continue detecting further inputs. The determination at block 250 can be made according to instructions from the requesting application. For example, the requesting application may continue to request further inputs until an "enter" or "OK" key press is detected, or until any of a variety of other application-specific criteria are met (e.g. the receipt of a specific number of virtual key presses that satisfy an input mask for a field). In such instances, the determination at block 250 is affirmative, and the processor 150 returns to block 230, maintaining the reference set 504. When the determination at block 250 is negative, the reference set 504 may be discarded, and the method 200 can end.

Figure 8:
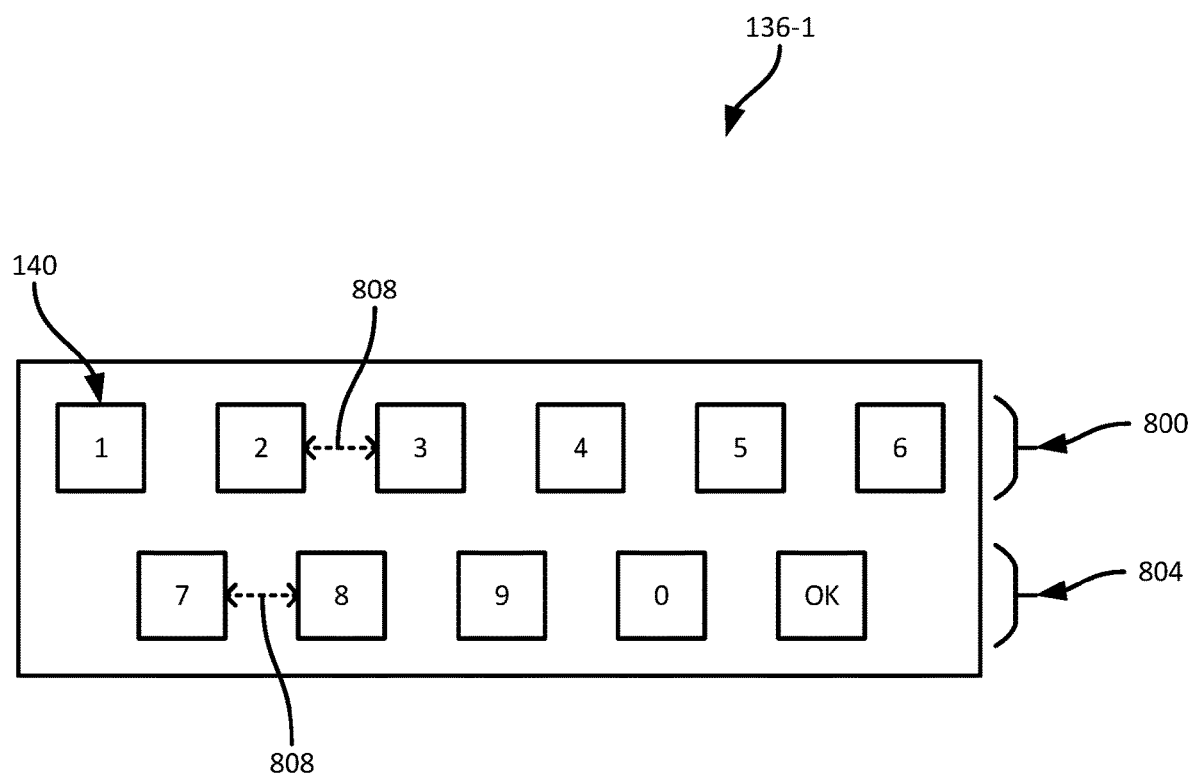
FIG. 8 is a diagram of a virtual keypad layout.

Certain features of the virtual keypads 136 themselves facilitate the detection of virtual key presses. In particular, as shown throughout the figures and highlighted in FIG. 8, each virtual keypad 136 may be implemented with a single row, or two rows, of keys 140. The examples herein include two rows, such as the first row 800 and the second row 804 indicated in FIG. 8.

In addition, the rows 800 and 804 are staggered relative to one another, and distances 808 between adjacent keys 140 in a given row are sufficient to accommodate the finger 602 without obscuring keys other than the intended target key. For instance, as shown in FIG. 6, the "3" key can be covered by the finger 602 without obscuring either of the "8" and "9" keys.

As will now be apparent, the functionality implemented by the system 100 enables the operator 108 to provide input data to the device 104 via virtual key presses, which are less susceptible to interpretation errors than input modalities such as voice input, without physically manipulating the device 104. The operator 108 can therefore obtain the benefit of keypad-based input, while minimizing the associated costs of physically interacting with the device 104. In addition, the method 200 is agnostic to the layout of any given virtual keypad 136, enabling configuration-free deployment of any number of keypad layouts.

Variations to the above systems and methods are contemplated. In some examples, the virtual keypads 136 can include machine-readable indicia such as QR codes or the like that encode keypad layout identifiers and/or layout information (e.g. a number of keys or the like). By detecting and decoding such information, e.g. at block 215, the processor 150 can determine an expected layout and determine at block 220 whether the expected layout is present in the current image.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   detecting, at a computing device coupled to an image sensor, an input request;
   in response to detecting the input request, capturing a reference image via the image sensor, the reference image containing a virtual keypad having a set of virtual keys;
   detecting, in the reference image, the set of virtual keys;
   capturing, via the image sensor, a key-press image of the virtual keypad;
   detecting, in the key-press image, a subset of the virtual keys;
   comparing the set of virtual keys and the subset of virtual keys to identify a key-press obscuring one of the virtual keys; and
   returning input data corresponding to the obscured virtual key,
   wherein capturing the reference image includes:
      capturing a sequence of initial images prior to the reference image,
      detecting respective subsets of the virtual keys in each of the initial images, and
      determining that the set of virtual keys from reference image matches the subset of virtual keys detected from at least one of the initial images.

2. The method of claim 1, wherein detecting the input request includes generating the input request at the computing device, via execution of an application; and
   wherein returning the input data includes passing the input data to the application.

3. The method of claim 1, further comprising:
   controlling an output device coupled to the computing device to generate an input notification including the input data.

4. The method of claim 1, further comprising: responsive to determining that the set of virtual keys from reference image matches the subset of virtual keys detected from at least one of the initial images, enabling an input mode prior to capturing the key-press image.

5. The method of claim 1, wherein capturing the key-press image includes:
   capturing a sequence of input images prior to the key-press image;
   in each input image, detecting at least a subset of the virtual keys; and
   determining, based on comparison of the subset of virtual keys detected in the key-press image and the subsets of virtual keys in the input images, that an input confirmation criterion is satisfied.

6. The method of claim 5, wherein the input confirmation criterion includes a threshold number of frames in which the same virtual key is obscured.

7. The method of claim 1, further comprising storing relative positions of the virtual keys in the reference image.

8. The method of claim 1, further comprising, prior to capturing the reference image:
   retrieving a stored virtual keypad layout; and
   controlling a projector coupled to the computing device to project the virtual keypad onto a surface within a field of view of the image sensor, according to the virtual keypad layout.

9. A computing device, comprising:
   a processor; and
   an interface coupling the processor to an image sensor;
   wherein the processor is configured to:
      detect an input request;
      in response to detecting the input request, capture a reference image via the image sensor, the reference image containing a virtual keypad having a set of virtual keys;
      detect, in the reference image, the set of virtual keys;
      capture, via the image sensor, a key-press image of the virtual keypad;
      detect, in the key-press image, a subset of the virtual keys;
      compare the set of virtual keys and the subset of virtual keys to identify a key-press obscuring one of the virtual keys; and
      return input data corresponding to the obscured virtual key,
   wherein the processor is configured to capture the reference image by:
      capturing a sequence of initial images prior to the reference image,
      detecting respective subsets of the virtual keys in each of the initial images, and
      determining that the set of virtual keys from reference image matches the subset of virtual keys detected from at least one of the initial images.

10. The computing device of claim 9, wherein the processor is configured to detect the input request by generating the input request via execution of an application; and to return the input data by passing the input data to the application.

11. The computing device of claim 9, wherein the processor is further configured to:
    controlling an output device coupled to the processor to generate an input notification including the input data.

12. The computing device of claim 9, wherein the processor is further configured, responsive to determining that the set of virtual keys from reference image matches the subset of virtual keys detected from at least one of the initial images, to enable an input mode prior to capturing the key-press image.

13. The computing device of claim 9, wherein the processor is configured to capture the key-press image by:
- capturing a sequence of input images prior to the key-press image;
- in each input image, detecting at least a subset of the virtual keys; and
- determining, based on comparison of the subset of virtual keys detected in the key-press image and the subsets of virtual keys in the input images, that an input confirmation criterion is satisfied.

14. The computing device of claim 13, wherein the input confirmation criterion includes a threshold number of frames in which the same virtual key is obscured.

15. The computing device of claim 9, wherein the processor is configured to store relative positions of the virtual keys in the reference image.

16. The computing device of claim 9, wherein the processor is further configured, prior to capturing the reference image, to:
- retrieve a stored virtual keypad layout; and
- control a projector coupled to the computing device to project the virtual keypad onto a surface within a field of view of the image sensor, according to the virtual keypad layout.

17. A system, comprising:
- a head-mounted display including an image sensor;
- a controller coupled to the head-mounted display, the controller configured to:
  - detect an input request;
  - in response to detecting the input request, capture a reference image via the image sensor, the reference image containing a virtual keypad having a set of virtual keys;
  - detect, in the reference image, the set of virtual keys;
  - capture, via the image sensor, a key-press image of the virtual keypad;
  - detect, in the key-press image, a subset of the virtual keys;
  - compare the set of virtual keys and the subset of virtual keys to identify a key-press obscuring one of the virtual keys; and
  - return input data corresponding to the obscured virtual key,
- wherein the controller is configured to capture the reference image by:
  - capturing a sequence of initial images prior to the reference image,
  - detecting respective subsets of the virtual keys in each of the initial images, and
  - determining that the set of virtual keys from reference image matches the subset of virtual keys detected from at least one of the initial images.

18. The system of claim 17, wherein the head-mounted display includes an eyeglass frame supporting the image sensor.

19. The system of claim 17, wherein the controller is further configured to render the input data on the head-mounted display.

20. The system of claim 17, further comprising a mobile computing device containing the controller.

* * * * *